(12) United States Patent
Long

(10) Patent No.: US 10,182,653 B1
(45) Date of Patent: Jan. 22, 2019

(54) FOLDING FISH ROD HOLDER AND RACK APPARATUS

(71) Applicant: William Robert Long, Cortez, CO (US)

(72) Inventor: William Robert Long, Cortez, CO (US)

( * ) Notice: Subject to any disclaimer, the term of this patent is extended or adjusted under 35 U.S.C. 154(b) by 0 days.

(21) Appl. No.: 15/660,530

(22) Filed: Jul. 26, 2017

(51) Int. Cl.
*A47B 81/00* (2006.01)
*A47F 7/00* (2006.01)

(52) U.S. Cl.
CPC .......... *A47B 81/005* (2013.01); *A47F 7/0028* (2013.01)

(58) Field of Classification Search
CPC ............................ A47B 81/005; A47F 7/0028
USPC .......... 211/64, 67, 68, 70.2, 70.8, 104, 195; 248/558
See application file for complete search history.

(56) References Cited

U.S. PATENT DOCUMENTS

| | | | | |
|---|---|---|---|---|
| 3,261,521 A * | 7/1966 | Meccico | ................... | B60R 7/14 211/64 |
| 3,477,586 A * | 11/1969 | Haluska | ............... | A47B 81/005 211/64 |
| 3,635,433 A * | 1/1972 | Anderson | .............. | A01K 97/08 211/70.8 |
| 4,133,131 A * | 1/1979 | Davy | ..................... | A01K 97/10 211/70.8 |
| 4,181,221 A * | 1/1980 | Tennant | ............... | A47B 81/005 206/317 |
| 5,495,969 A * | 3/1996 | Cardenas | .................. | B60R 7/14 211/195 |
| 5,626,379 A * | 5/1997 | Scott | ..................... | A47B 81/005 211/195 |
| 5,657,883 A * | 8/1997 | Badia | ..................... | A01K 97/10 211/60.1 |
| 2008/0083680 A1 * | 4/2008 | Silva | ....................... | A63D 15/10 211/68 |
| 2012/0248047 A1 * | 10/2012 | Tanabe | ................... | A47B 43/00 211/13.1 |
| 2013/0186845 A1 * | 7/2013 | Harris | .................. | A47B 81/005 211/70.8 |
| 2014/0332655 A1 * | 11/2014 | Colbert | .................. | A01K 97/10 248/512 |
| 2016/0045024 A1 * | 2/2016 | Roberts | ................ | A47B 81/005 248/512 |

* cited by examiner

*Primary Examiner* — Michael Safavi
(74) *Attorney, Agent, or Firm* — Mohr Intellectual Property Law Solutions, P.C.

(57) ABSTRACT

A folding fish rod holder and rack apparatus including a base frame having a triangular shaped front cross member, a back cross member and a medial cross bar. A foldable rectangular stand has a pair of left and right telescoping support beams and a top mantle. Each telescoping support beam is hingeably attached to the rectangular base frame at the cross member. A plurality of evenly spaced circular grip holds is disposed on the top mantle of the rectangular stand, and a plurality of secondary spaced grip holds is disposed on the triangular front cross member. The grip holds secure the butt of a fishing rod. A plurality of padded rod grooves is located on the back cross member of the rectangular base, and a plurality of secondary padded rod grooves is located along the top mantle of the rectangular stand. The padded rod grooves secure the tip of the fishing rod.

1 Claim, 5 Drawing Sheets

US 10,182,653 B1

FOLDING FISH ROD HOLDER AND RACK APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of fishing rod racks are known in the prior art. However, what has been needed is a folding fish rod holder and rack apparatus including a rectangular base frame and a foldable rectangular stand. What has further been needed is for the rectangular base frame to have a triangular front cross member, a back cross member and a medial cross bar. What has also been needed is for the rectangular stand to have a pair of telescoping support beams and a top mantle. Each of the parallel support beams is disposed at the cross bar and hingeably attached to the rectangular base. The foldable rectangular stand is either in a collapsed position with the top mantle proximal to the triangular front cross member of the rectangular base frame, or alternately, the top mantle erect above the cross beam of the rectangular base. What has also been needed is a plurality of evenly spaced circular girp holds on the top mantle and on the back cross member to secure the butt of a fishing pole. Finally, what has also been needed is a plurality of padded rod grooves configured to secure the tip of the fishing rod. The folding fish rod holder and rack apparatus thus allows a user to not only securely store fishing poles, but to store fishing poles in a variety of configurations.

FIELD OF THE INVENTION

The present invention relates to fishing rod racks, and more particularly, to a folding fish rod holder and rack apparatus.

SUMMARY OF THE INVENTION

The general purpose of the fishing rod rack, described subsequently in greater detail, is to provide a folding fish rod holder and rack apparatus that has many novel features that result in a fishing rod rack apparatus that is not anticipated, rendered obvious, suggested, or even implied by prior art, either alone or in combination thereof. To accomplish this, the folding fish rod holder and rack apparatus includes a rectangular base frame and a foldable rectangular stand. The rectangular base frame has a left side member, a right side member, a triangular front cross member, a back cross member and a cross bar medially disposed between the left side member and the right side member.

The foldable rectangular stand has a pair of parallel telescoping support beams, each with a lower portion, an upper portion, and a top mantle. The lower portion of each of a left support beam and a right support beam of the pair of parallel telescoping support beams is disposed at the cross beam of the rectangular base and hingeably attached to the each of the left side member and the right side member, respectively, of the rectangular base.

The foldable rectangular stand is either collapsed with the top mantle proximal to the triangle shaped front cross member of the rectangular base frame, or alternately, the left and right support beams are hingeably locked and the top mantle is disposed above the cross beam of the rectangular base. A pair of adjustment knobs on each upper portion of the left and right telescopic support beams is configured to change the height of the support beams.

A plurality of evenly spaced primary circular grip holds is disposed on the bottom side of the top mantle. The grip holds are configured to secure the butt of a fishing rod. A corresponding plurality of evenly spaced padded rod grooves are located on the edge of the top mantle. The padded rod grooves are configured to secure the tip of the fishing rod.

A plurality of evenly spaced secondary circular grip holds is disposed on the triangular front cross member. The plurality of secondary grip holds align with the rod grooves on the top mantle of the rectangular stand when the rectangular stand is upright, or alternately, the plurality of secondary circular grip holds align with the rod grooves on the back cross member when the rectangular stand is collapsed.

Thus, has been broadly outlined the more important features of the folding fish rod holder and rack apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
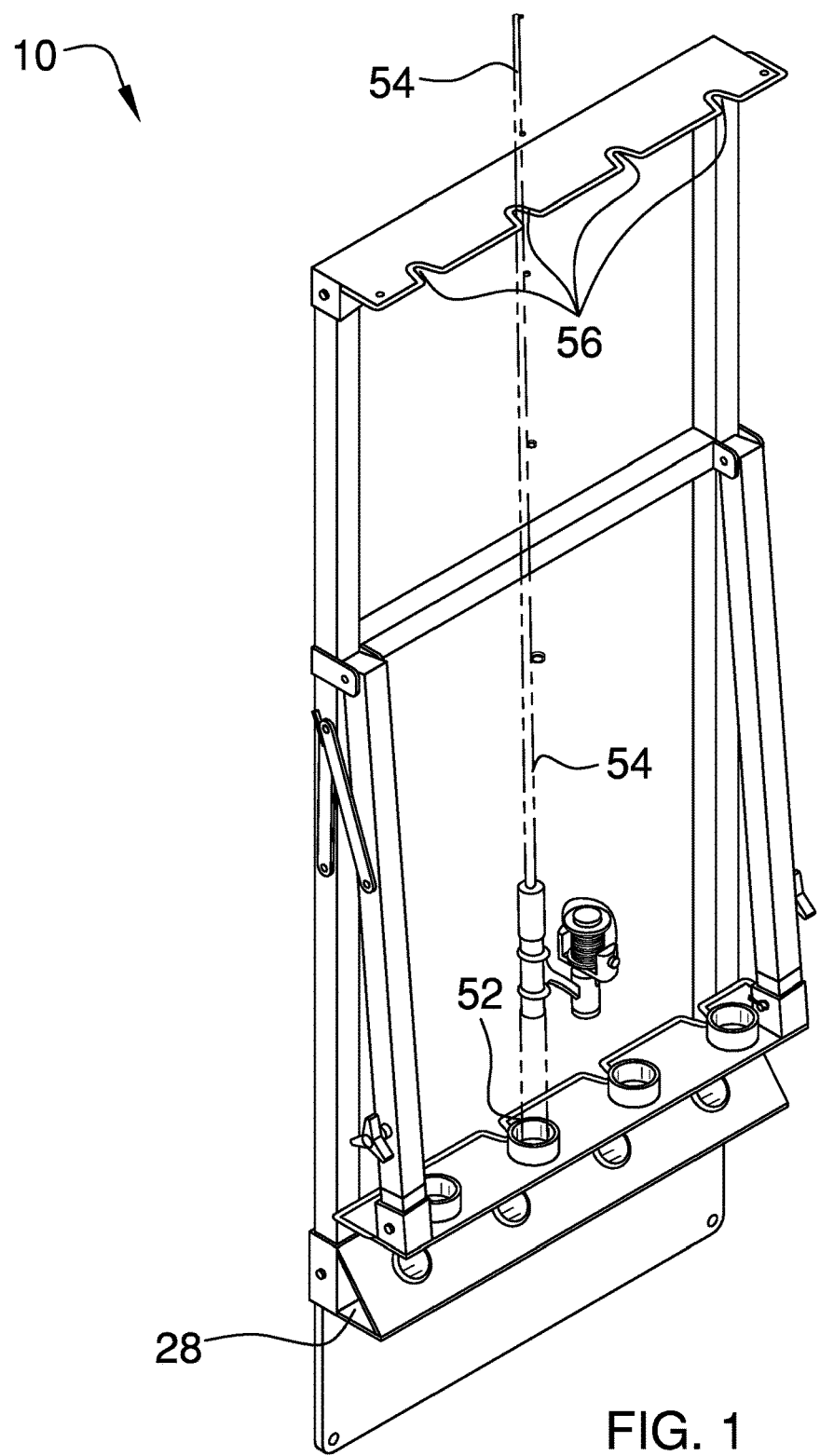
FIG. 1 is an isometric view showing the apparatus in a collapsed position.
Figure 2:
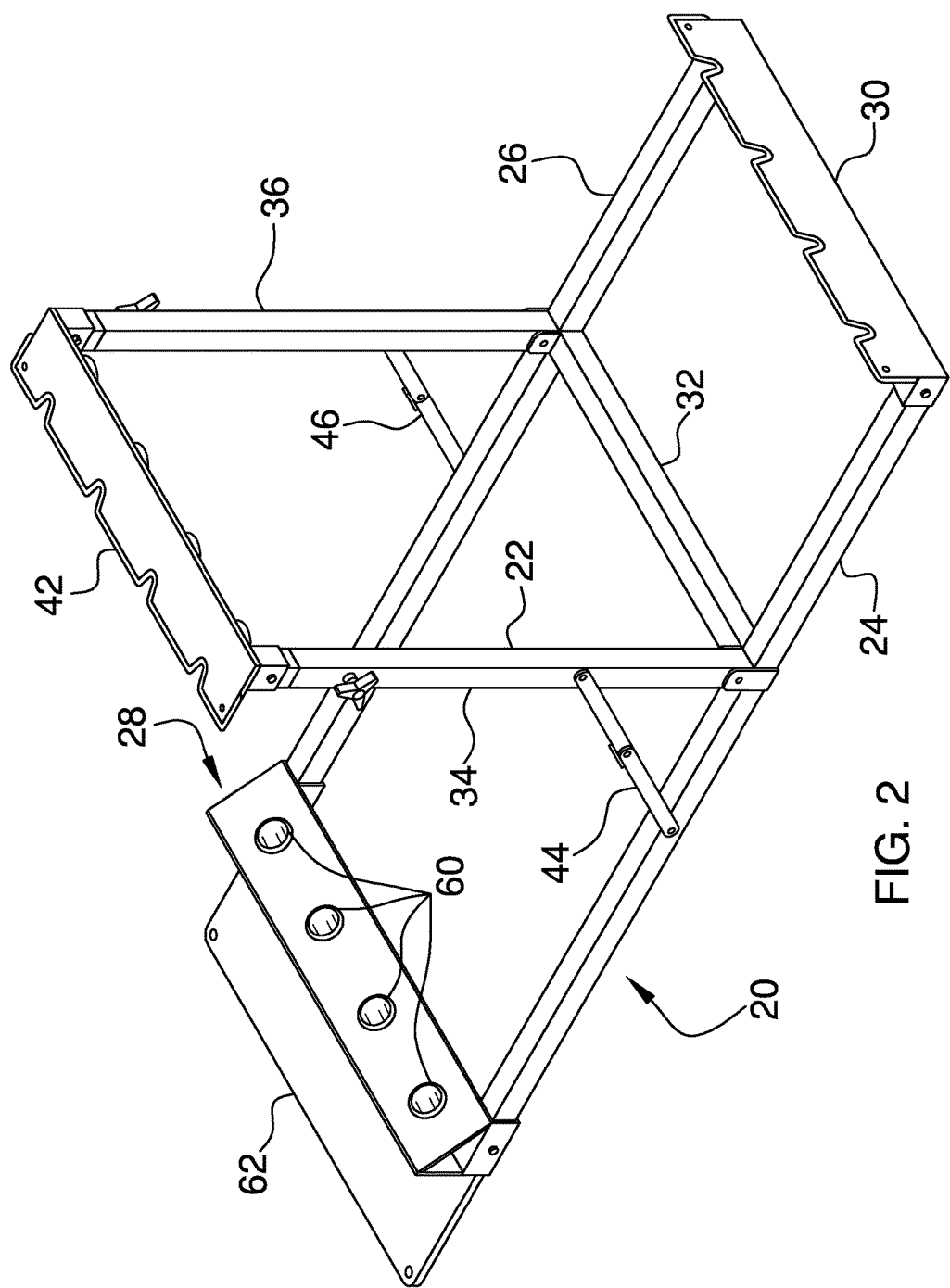
FIG. 2 is an isometric showing the apparatus in an erect position.
Figure 3:
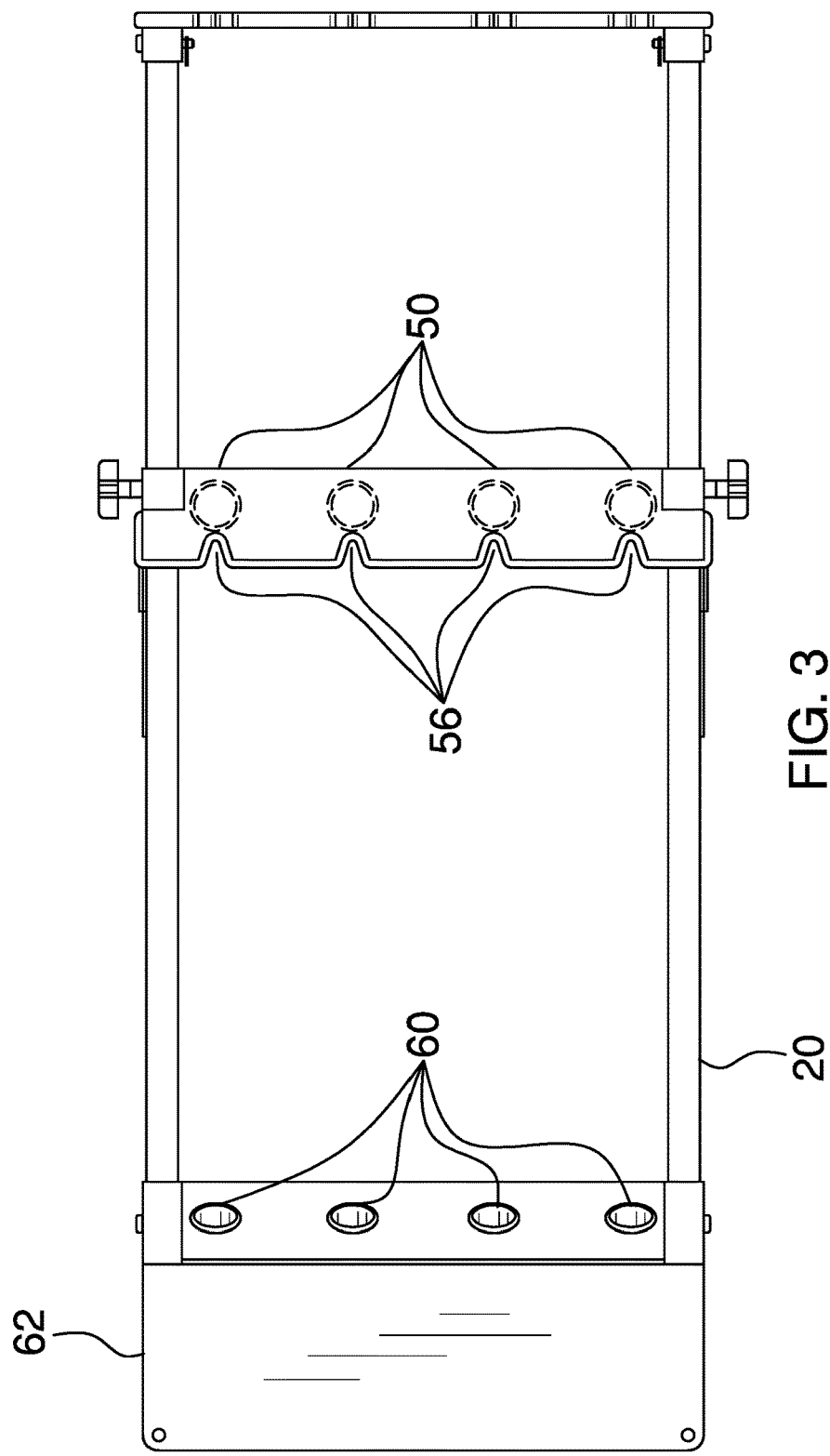
FIG. 3 is a top view showing the apparatus in an erect position.
Figure 4:
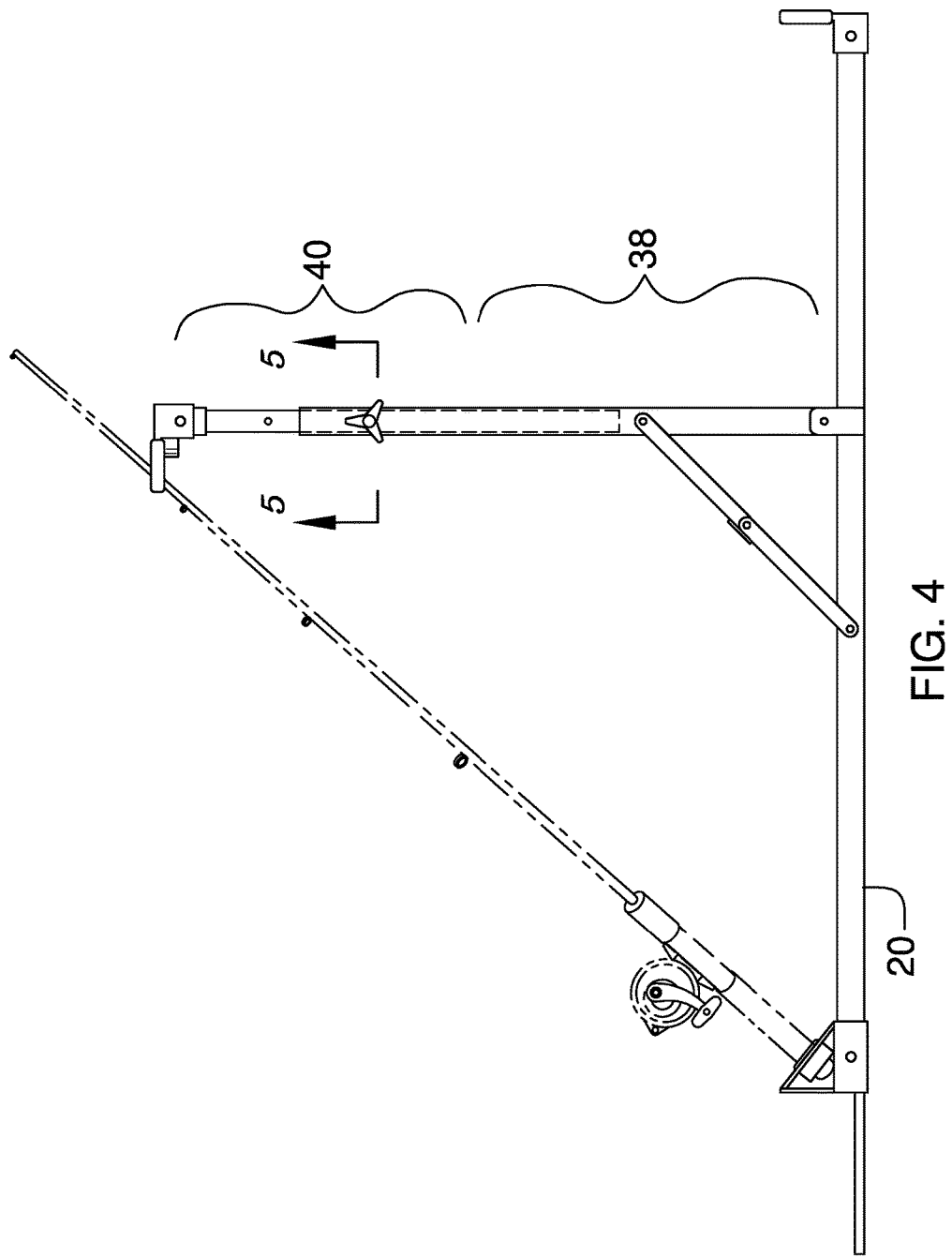
FIG. 4 is a side view showing the apparatus in a collapsed position.
Figure 5:
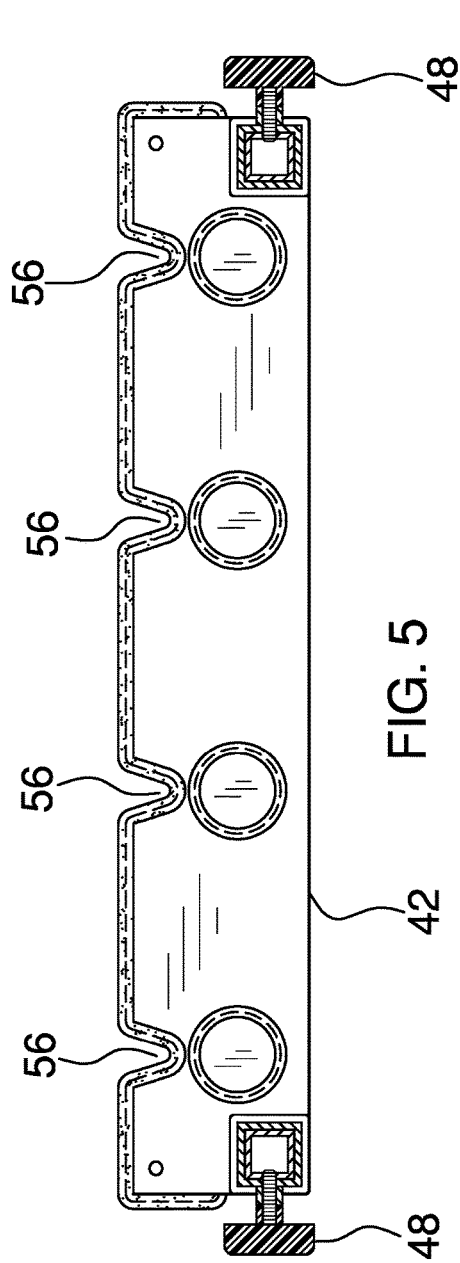
FIG. 5 is a cross sectional top view.
Figure 6:
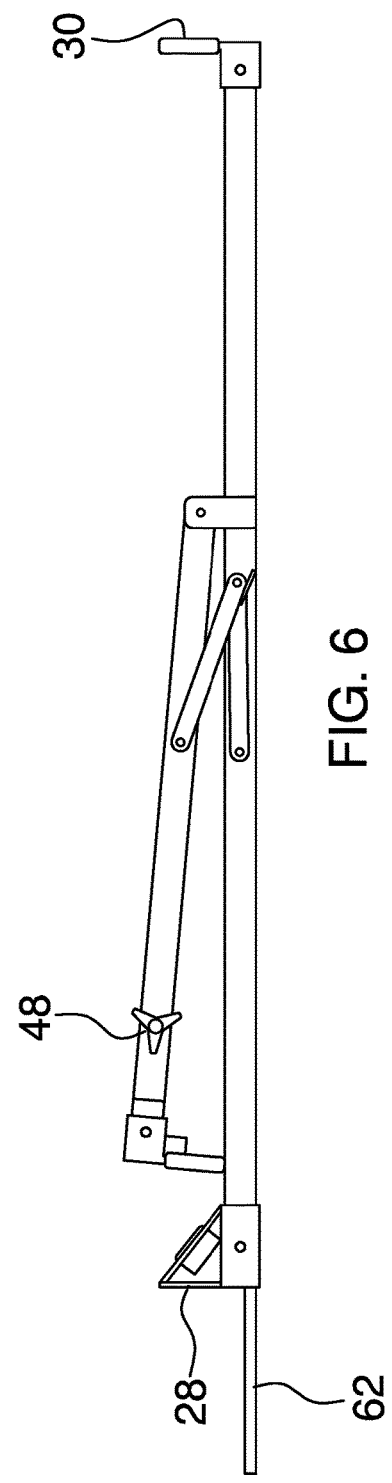
FIG. 6 is a side view showing the apparatus in a collapsed position.

With reference now to the drawings, and in particular FIGS. 1 through 6 thereof, an example of a fishing rod rack employing the principles and concepts of the present folding fish rod holder and rack apparatus and generally designated by the reference number 10 will be described.

Referring to FIGS. 1 through 6 the present folding fish rod holder and rack apparatus 10 is illustrated. The folding fish rod holder and rack apparatus 10 includes a rectangular base frame 20 and a foldable rectangular stand 22. The rectangular base frame 20 has a left side member 24, a right side member 26, a triangular front cross member 28, a back cross member 30 and a cross bar 32 medially disposed between the left cross member 24 and the right side member 26.

The foldable rectangular stand 22 has a left telescoping support beam 34 and right telescoping support beam 36, each of which has a lower portion 38, an upper portion 40, and a top mantle 42. The lower portion 38 of the left telescoping support beam 34 has a left hinge 44 attached to the left side member 24 of the rectangular base frame 20, and the right telescoping support beam 36 has a right hinge 46 attached to the right side member 26 of the rectangular base frame 20. The left support beam 34 and the right support beam 36 is each disposed at the cross bar 32 of the rectangular base 20.

The foldable rectangular stand 22 is either in a collapsed position, with the top mantle 42 disposed proximal to the triangular front cross member 28 of the rectangular base frame 20, or alternately, with the left telescoping support beam 34 and the right telescoping support beam 36 hingeably locked and the top mantle 42 disposed above and parallel to the cross bar 32 of the rectangular base frame 20.

A pair of adjustment knobs 48 is disposed on each of the upper left portion 38 of the left telescopic support beam 34 and the upper right portion 40 of the left telescopic support beam 34. The pair of adjustment knobs 48 is configured to change the height of the support beams.

A plurality of evenly spaced circular grip holds 50 is disposed on the top mantle 42. The grip holds 50 are configured to secure the butt 52 of a fishing rod 54. Also, a plurality of evenly spaced padded rod grooves 56 is disposed on the top mantle 42. The padded rod grooves 56 are configured to secure the tip 58 of the fishing rod 54.

A plurality of evenly spaced secondary circular grip holds 60 disposed on the triangular front cross member 28 align with the rod grooves 56 disposed on the top mantle 42 of the foldable rectangular stand 22 when the rectangular stand 22 is upright, or alternately, the secondary circular grip holds 60 on the triangle shaped front cross member 28 align with the rod grooves 56 on the back cross member 30 when the rectangular stand 22 is collapsed. A solid rectangular platform 62 extended distally below the front triangle shaped cross member 28 configured to mount atop a fishing tackle box.

What is claimed is:

1. A folding fish rod holder and rack apparatus comprising:
    a rectangular base frame having a left side member, a right side member, a triangular front cross member, a back cross member and a cross bar, wherein the cross bar is medially disposed between the left side member and the right side member;
    a foldable rectangular stand having a telescoping left support beam, a telescoping right support beam, and a top mantle having a bottom side and an interior edge, each of the telescoping left support beam and the telescoping right support beam having a lower portion and an upper portion, wherein the lower portion of the left support beam is disposed at the cross bar of the rectangular base and hingedly attached to the left side member of the rectangular base, and the bottom portion of the right support beam is disposed at the cross bar and hingedly attached to the right side of the rectangular base;
    wherein the foldable rectangular stand has an elevated position and an alternate collapsed position, wherein the foldable rectangular stand is in the elevated position when the top mantle is disposed parallel to the crossbar of the rectangular base frame, wherein the foldable rectangular stand is in the collapsed position when the top mantle is disposed proximal to the triangular front cross member of the rectangular base frame;
    a pair of adjustment knobs, each of the pair of adjustment knobs disposed on each of the upper portions of the telescopic support beams, wherein the pair of adjustment knobs is configured to change the height of the left support beam and the right parallel support beam;
    a first plurality of evenly spaced circular grip holds disposed on the bottom surface of the top mantle, wherein the first plurality of evenly spaced circular grip holds is configured to secure the butt of a fishing rod;
    a first plurality of evenly spaced padded rod grooves disposed on the edge of the top mantle, wherein the first plurality of evenly spaced padded rod grooves is configured to secure the tip of the fishing rod;
    a second plurality of evenly spaced circular grip holds disposed on the triangular shaped front cross member of the rectangular frame; wherein the second plurality of evenly spaced circular grip holds is aligned parallel to the first padded rod grooves when the rectangular stand is erect;
    a second plurality of padded rod grooves disposed on the back cross member of the rectangular frame, wherein the second plurality of padded rod grooves is aligned with the first grip holds when the foldable rectangular stand is collapsed; and
    a solid rectangular platform extended distally below the front triangle shaped cross member configured to mount atop a fishing tackle box.

* * * * *